W. A. BESSERDICH.
VARIABLE SPEED FRICTIONAL TRANSMISSION MECHANISM.
APPLICATION FILED APR. 16, 1913.
1,116,373.
Patented Nov. 10, 1914.
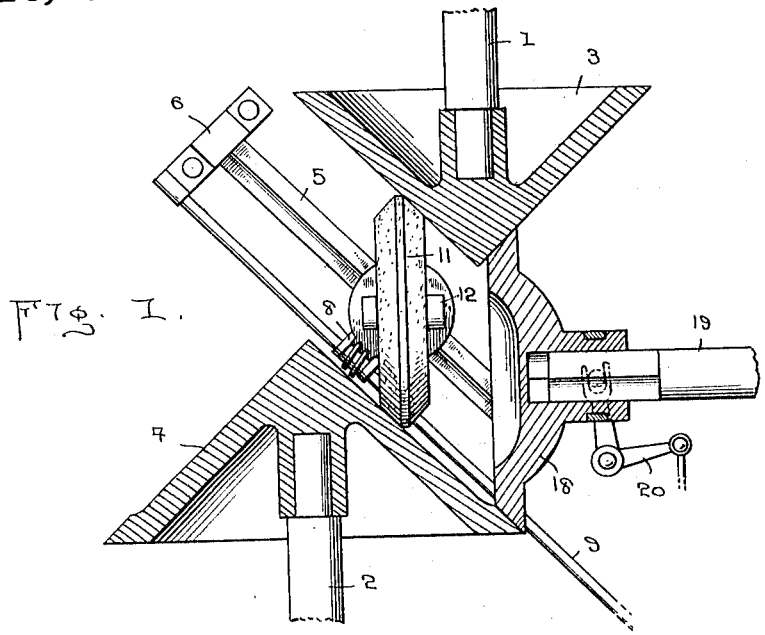
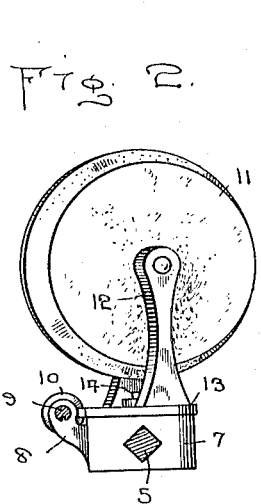
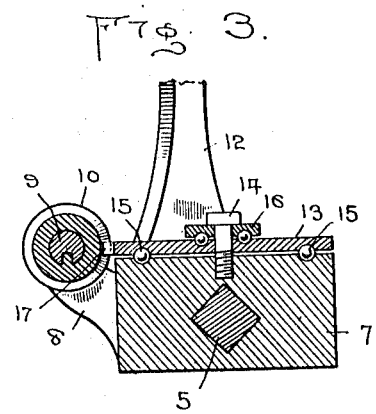
Inventor
A. Besserdich

UNITED STATES PATENT OFFICE.

WILLIAM A. BESSERDICH, OF CLINTONVILLE, WISCONSIN.

VARIABLE-SPEED FRICTIONAL TRANSMISSION MECHANISM.

1,116,373.

Specification of Letters Patent.

Patented Nov. 10, 1914.

Application filed April 16, 1913. Serial No. 761,416.

*To all whom it may concern:*

Be it known that I, WILLIAM A. BESSERDICH, a citizen of the United States, residing at Clintonville, in the county of Waupaca and State of Wisconsin, have invented certain new and useful Improvements in Variable-Speed Frictional Transmission Mechanism; and I do hereby declare the following to be a full, clear, and exact description of the invention, such as will enable others skilled in the art to which it appertains to make and use the same.

The object of this invention is the provision of a combination of frictional elements for transmitting rotary motion from one shaft to another and for causing variations in the speed of the respective shafts.

Another object of the invention is the provision of an intermediate frictional element having means connected therewith for changing its location with respect to the driving and driven shafts and also for entirely disengaging the intermediate element from the shafts.

Another object is the provision of a manually operable frictional element working in conjunction with parts of the variable speed mechanism and adapted to reverse the direction of rotation of the driven element.

In the accompanying drawings, Figure 1 represents a horizontal sectional view through the variable speed transmission. Fig. 2 represents a perspective view partly in section of the intermediate friction wheel and its support. Fig. 3 represents a detail sectional view through the slidable support for the intermediate wheel and the guiding member therefor.

Referring to these drawings, in which similar reference characters correspond with similar parts throughout the several views, 1 indicates a drive shaft, 2 a driven shaft and 3 and 4 friction cones fixed on the adjacent ends of the shafts 1 and 2, respectively. The bearing supports (not shown), for the shafts may be constructed in any approved form. The shafts are so arranged that the adjacent surfaces of the cones 3 and 4 are spaced and parallel.

5 indicates an angular guide rod rigidly secured in brackets 6 carried by a suitable support (not shown). This guide rod 5 is disposed centrally between the cones 3 and 4, and parallel to the faces thereof. A block 7 is mounted for longitudinal movement over the guide rod 5 and fits said rod somewhat loosely for a reason which will be hereinafter made apparent. Integral bracket arms 8 are formed on the slidable block 7 for rotatably receiving the operating rod 9 to which is fixed the worm 10. As the worm 10 is confined between the arms 8, it is obvious that longitudinal movement of the operating rod 9 will be also imparted to the slidable block 7.

The intermediate wheel for transmitting motion from the drive cone 3 to the cone 4 is indicated at 11, and is formed with oppositely inclined faces suitably faced with fibrous material for frictional engagement with the cones. The intermediate wheel is mounted for rotation between the arms 12 of a base 13, which latter is pivotally secured to the block 7 by a bolt 14. To minimize friction, bearing balls 15 are positioned in suitable channels formed in the adjacent surfaces of the block 7 and base 13, and also in the washer 16 disposed under the head of the bolt 14. The edge of the base 13 adjacent the worm 10 is provided with teeth 17 engaging the threads of said worm, whereby rotary movement of the operating rod 9 is imparted to the supporting frame of the intermediate wheel 11, causing the position of the latter to be changed and its bearing surfaces engaged or disengaged from the faces of the cones 3 and 4.

18 indicates a second intermediate or reverse gear wheel having a bevel fiber covered face adapted to engage the large end of the driven cone 4 and near the point or apex of the drive gear. The reverse wheel 18 is slidably mounted over the end of an auxiliary shaft 19 supported in suitable bearings (not shown), and a bell crank 20 connected therewith and with a suitable hand lever or the like (not shown), for shifting the wheel into and out of engagement with the cones.

Reversal of the direction of rotation of the driven shaft 2 by the employment of the reverse wheel 18 is due to the fact that said wheel engages the driven cone 4 upon the same side of its axis as the intermediate wheel 11, but upon the opposite side of the drive cone 3 from that engaged by said wheel 11.

While I have here shown the driven cone 4 mounted upon the extreme end of the driven shaft 2, it will be clearly apparent that said cone may be apertured so as to fit upon the shaft 2 at any point midway its ends.

The operating rod 9 is connected with any suitable means (not shown), for imparting thereto longitudinal or rotary movement, at the will of the operator. It will be apparent that longitudinal movement of said rod will shift the intermediate friction wheel 11, causing the speed of the driven shaft 2 to be decreased as said intermediate wheel approaches the center or apex of the drive cone 3, and vice versa. Rotary manipulation of the operating rod 9, however, turns the base 13 together with the intermediate frictional wheel 11 upon the pivot bolt 14, thus breaking the connection between the drive and driven cones 3 and 4.

To reverse the rotation of the driven shaft 2, the intermediate wheel 11 is first disengaged from the faces of the cones as explained, then the reverse wheel 18 is moved into operative position against the faces of the cones by means of suitable means, (not shown).

What I claim is:—

1. The combination with drive and driven shafts, cones secured to said shafts, an intermediate friction wheel having oppositely beveled faces normally engaging the adjacent surfaces of the cones, and a reverse wheel adapted to coöperate with said cones to reverse the rotation of the driven shaft.

2. The combination with drive and driven shafts, cones secured to said shafts, an intermediate friction wheel normally-engaging the adjacent surfaces of the cones, means for moving said friction wheel on a line parallel to the adjacent surfaces of the cones, and means for shifting the axis of said friction wheel.

3. The combination with drive and driven shafts; of a cone mounted on each of said shafts, an intermediate friction wheel mounted between said cones, means for adjusting said intermediate wheel with respect to the surfaces of said cones, and a reverse wheel adapted for frictional engagement with said cones for reversing the rotation of the driven shaft.

4. In combination, drive and driven shafts, cones secured to said shafts, a guide rod arranged adjacent said cones, a block movable longitudinally of said guide rod, a bearing member rotatably secured to said block, an intermediate friction wheel rotatably mounted in said bearing member and normally engaging the adjacent surfaces of the cones, and means for rotating said bearing member and for moving said block longitudinally of said guide rod.

In testimony whereof I have signed my name to this specification in the presence of two subscribing witnesses.

WILLIAM A. BESSERDICH.

Witnesses:
LEVI C. LARSON,
CHAS. J. LAUX.

Copies of this patent may be obtained for five cents each, by addressing the "Commissioner of Patents, Washington, D. C."